US012110629B1

(12) United States Patent
Ramsey

(10) Patent No.: US 12,110,629 B1
(45) Date of Patent: Oct. 8, 2024

(54) DRYER LINT EXHAUST CLEANING APPARATUS AND METHOD FOR USING

(71) Applicant: Kenneth Steve Ramsey, Charlotte, NC (US)

(72) Inventor: Kenneth Steve Ramsey, Charlotte, NC (US)

( * ) Notice: Subject to any disclaimer, the term of this patent is extended or adjusted under 35 U.S.C. 154(b) by 538 days.

(21) Appl. No.: 17/408,996

(22) Filed: Aug. 23, 2021

Related U.S. Application Data

(63) Continuation of application No. 17/148,097, filed on Jan. 13, 2021, now Pat. No. 11,098,437.

(51) Int. Cl.
*D06F 58/22* (2006.01)
*B08B 5/02* (2006.01)
*B08B 9/032* (2006.01)

(52) U.S. Cl.
CPC ................ *D06F 58/22* (2013.01); *B08B 5/02* (2013.01); *B08B 9/0328* (2013.01); *B08B 2209/032* (2013.01)

(58) Field of Classification Search
CPC ....... B08B 2209/032; B08B 5/02; B08B 9/00; B08B 9/027; B08B 9/032; B08B 9/035; B08B 9/0328; D06F 58/22
See application file for complete search history.

(56) References Cited

U.S. PATENT DOCUMENTS

| | | | | |
|---|---|---|---|---|
| 5,628,122 | A | 5/1997 | Spinardi | |
| 7,017,280 | B2 | 3/2006 | Green et al. | |
| 7,325,332 | B2 * | 2/2008 | Chung | D06F 58/22 34/602 |
| 11,098,437 | B1 | 8/2021 | Ramsey | |
| 2015/0059200 | A1 | 3/2015 | Prajescu et al. | |
| 2018/0297088 | A1 * | 10/2018 | Lindstrand | B08B 9/035 |
| 2018/0297805 | A1 | 10/2018 | Lindstrand | |
| 2020/0378055 | A1 | 12/2020 | Hato | |

FOREIGN PATENT DOCUMENTS

| | | | |
|---|---|---|---|
| GB | 2513230 A | * 10/2014 | A01G 20/43 |

* cited by examiner

*Primary Examiner* — Eric J Rosen
*Assistant Examiner* — John C Merino
(74) *Attorney, Agent, or Firm* — Schwartz Law Firm, P.C.

(57) ABSTRACT

A duct cleaning appliance is adapted for cleaning a ventilation system of a clothes dryer. The duct cleaning appliance includes a hollow duct cleaning tool operatively connected at an open proximal end to a portable airstream appliance adapted for generating a pressurized airflow. An open distal end of the duct cleaning tool is placed over a screen housing opening of the clothes dryer, such that the distal end closely engages the clothes dryer to operatively air-seal the screen housing opening. The portable airstream appliance is then activated to direct the pressurized airflow through the duct cleaning tool, lint exhaust and ventilation system of the clothes dryer, thereby evacuating lint and debris collected inside the ductwork of the ventilation system.

10 Claims, 8 Drawing Sheets

DRYER LINT EXHAUST CLEANING APPARATUS AND METHOD FOR USING

TECHNICAL FIELD AND BACKGROUND OF THE DISCLOSURE

The present disclosure relates broadly and generally to a dryer duct cleaning tool and method for cleaning a clothes dryer ventilation system.

Clothes dryers cause thousands of house fires per year worldwide, and many of those are caused by excess lint collected in ductwork. According to Consumer Reports® and other publications, your clothes dryer is much more likely to catch on fire because of lint buildup than because of an electrical problem. In the span of a year or less, the lint build up can cause a blockage in the dryer ventilation system. This not only creates a fire hazard, but can lead longer drying times and wasted energy. Because of this, fire departments generally recommend that the dryer ventilation system be properly cleaned at least once a year.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a method for cleaning a ventilation system of a clothes dryer. The ventilation system includes ductwork communicating with a lint exhaust of the clothes dryer and extending to a remote discharge location. The method comprises operatively connecting an open proximal end of a hollow duct cleaning tool to a portable airstream appliance adapted for generating a pressurized airflow. A lint screen is first removed from a screen housing opening at the lint exhaust of the clothes dryer. An open distal end of the hollow duct cleaning tool is then placed over the screen housing opening of the clothes dryer, such that the distal end closely engages the clothes dryer to operatively air-seal the screen housing opening. The portable airstream appliance is then activated to direct the pressurized airflow through the duct cleaning tool, lint exhaust and ventilation system of the clothes dryer, thereby evacuating lint and debris collected inside the ductwork of the ventilation system.

The term "pressurized airflow" refers broadly herein to either a positive laminar airflow or a negative laminar airflow (suction).

The "portable airstream appliance" may comprise any standard electrical or gas-powered blower configured to generate a positive laminar airflow, or any standard vacuum appliance configured to generate a negative laminar airflow.

According to one exemplary embodiment, the portable airstream appliance comprises an elongated hollow appliance tube.

According to another exemplary embodiment, an adapter is located at the proximal end of the duct cleaning tool and is configured to removably attach the duct cleaning tool to the appliance tube of the portable airstream appliance.

According to another exemplary embodiment, the duct cleaning tool comprises an elongated hollow air transfer tube extending between the open proximal and distal ends of the duct cleaning tool.

According to another exemplary embodiment, the distal end of the duct cleaning tool is arcuately turned relative to a longitudinal axis of the air transfer tube.

According to another exemplary embodiment, an exchangeable dryer interface is located at the distal end of the duct cleaning tool.

According to another exemplary embodiment, the portable airstream appliance comprises a portable handheld blower configured to generate a positive airflow through the duct cleaning tool.

According to another exemplary embodiment, the blower is configured to generate a flow rate greater than 500 CFM.

According to another exemplary embodiment, the method includes evacuating the lint debris from the ductwork of the ventilation system at the remote discharge location.

According to another exemplary embodiment, prior to locating the open distal end of the duct cleaning tool over the screen housing opening of the clothes dryer, a loose granular material is inserted through the screen housing opening into the ductwork of the ventilation system.

In another exemplary embodiment, the present disclosure comprises a duct cleaning appliance adapted for cleaning a ventilation system of a clothes dryer. The ventilation system comprises ductwork communicating with a lint exhaust of the clothes dryer and extending to a remote discharge location. The duct cleaning appliance incorporates a portable handheld blower and an attached duct cleaning tool. The handheld blower comprises an elongated hollow appliance tube, and a motor configured to generate a positive airflow through the hollow appliance tube. The duct cleaning tool is substantially hollow and has an open proximal end and an open distal end. The open proximal end is configured to removably connect the duct cleaning tool to the hollow appliance tube of the blower. The open distal end is configured to cover a screen housing opening at the lint exhaust of the clothes dryer. Upon locating the open distal end of the duct cleaning tool over the screen housing opening of the clothes dryer and activating the blower, pressurized airflow is generated and directed through the duct cleaning tool and lint exhaust of the clothes dryer thereby evacuating lint and debris collected inside the ductwork of the ventilation system.

In yet another exemplary embodiment, the present disclosure comprises a duct cleaning tool configured for use in combination with a portable airstream appliance to clean a ventilation system of a clothes dryer. The ventilation system comprises ductwork communicating with a lint exhaust of the clothes dryer and extending to a remote discharge location. The duct cleaning tool has open proximal and distal ends and an elongated hollow air transfer tube extending between the open proximal and distal ends. The open proximal end is configured to removably connect the duct cleaning tool to the portable airstream appliance. The open distal end of the duct cleaning tool is configured to cover a screen housing opening at the lint exhaust of the clothes dryer. Upon (a) connecting the duct cleaning tool to the portable airstream appliance, (b) locating the open distal end of the duct cleaning tool over the screen housing opening of the clothes dryer, and (c) activating the portable airstream appliance, pressurized airflow is generated and directed through the duct cleaning tool, lint exhaust and ventilation system of the clothes dryer, thereby evacuating lint and debris collected inside the ductwork of the ventilation system.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
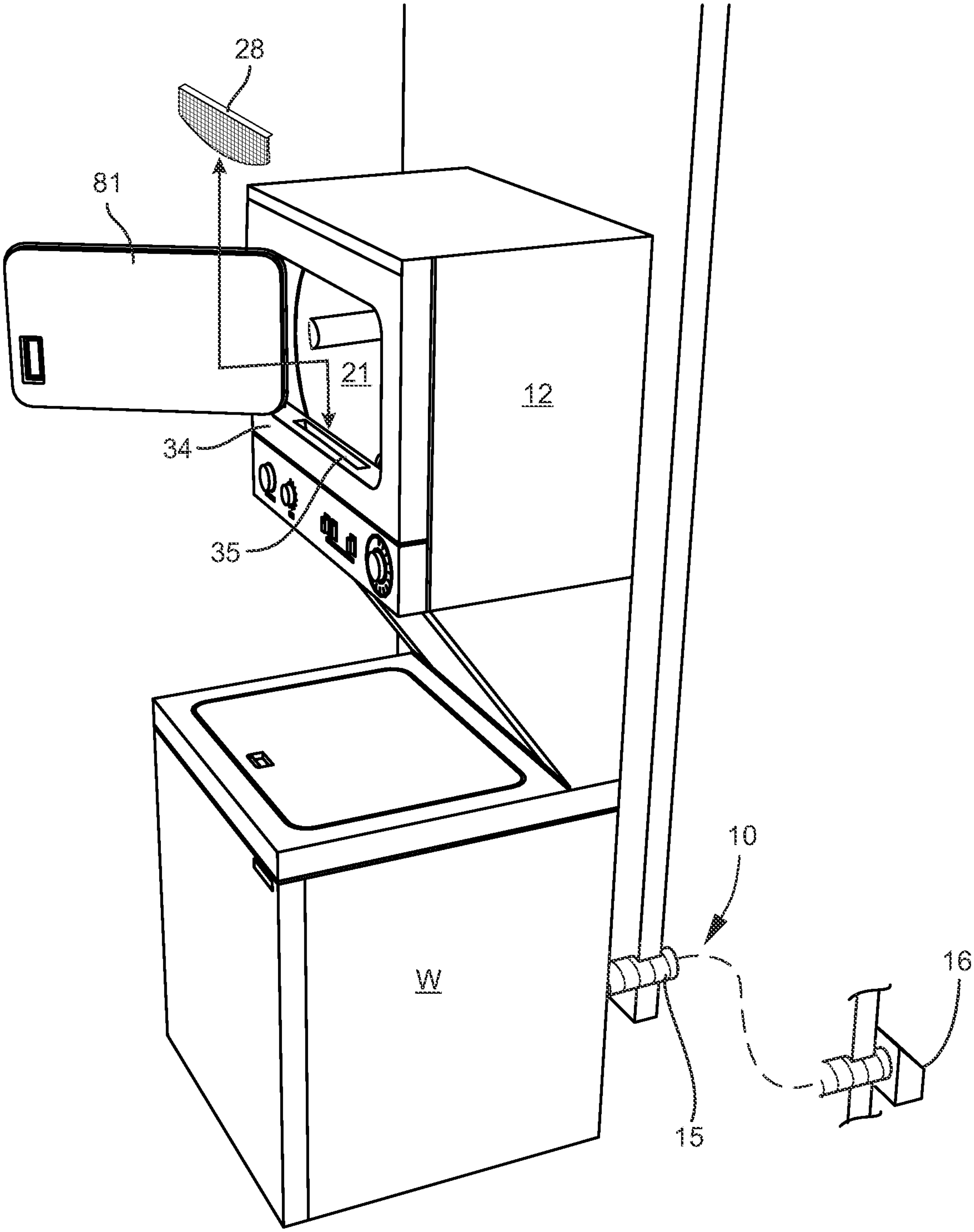
FIG. 1 is a view illustrating a common stacked washer/dryer combination of the prior art.
Figure 2:
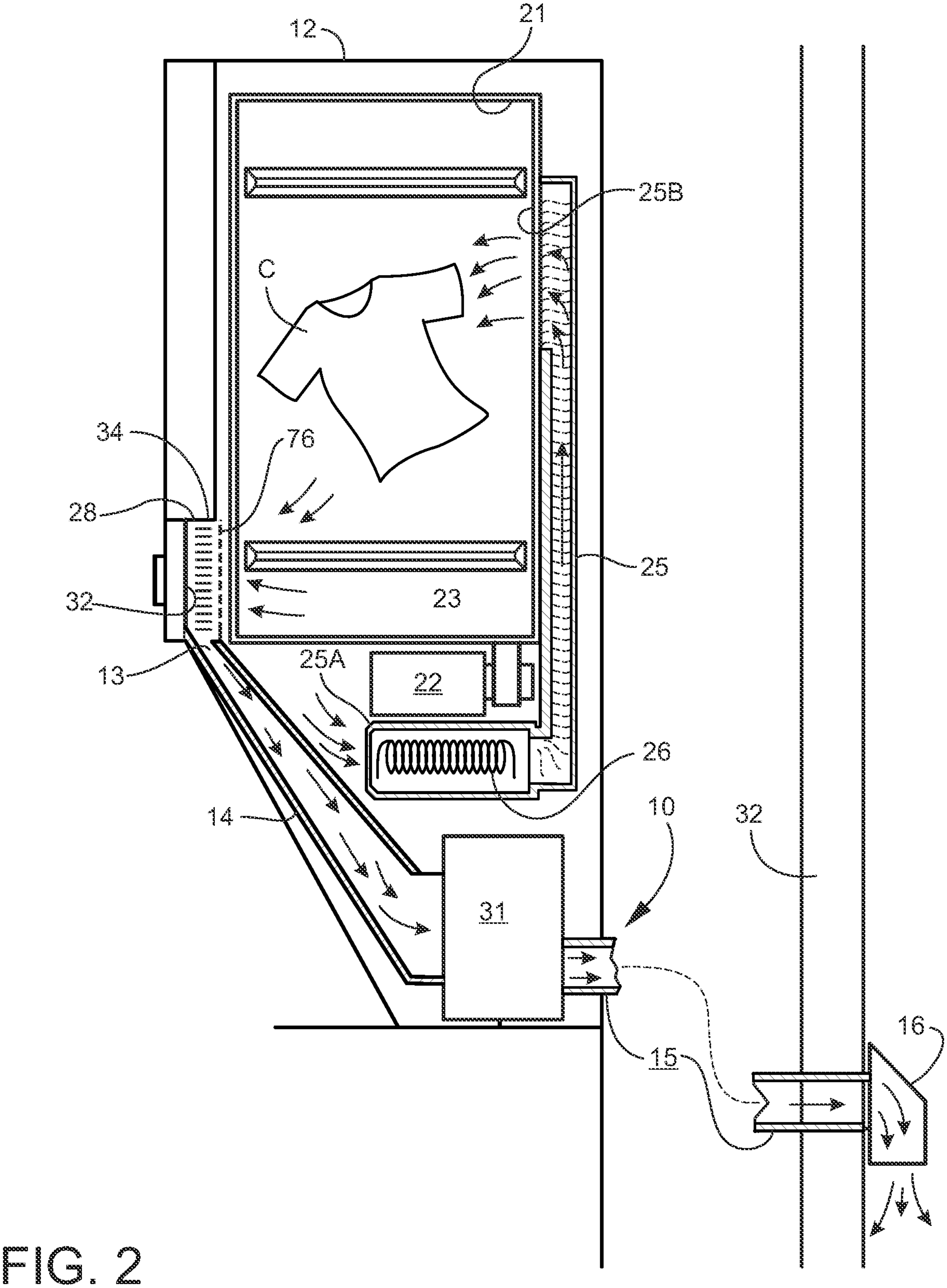
FIG. 2 is diagrammatic view demonstrating airflow through a prior art clothes dryer and dryer ventilation system.

Referring now specifically to FIGS. 1 and 2 of the drawings, in exemplary embodiments the present disclosure comprises a method for cleaning a ventilation system 10 of a conventional clothes dryer 12—the ventilation system 10 connecting to dryer exhaust 13 and exhaust duct 14 and comprising standard metal ductwork 15 extending inside a building (e.g., apartment or condominium complex) and exhausting through an outside hooded vent 16. The present method utilizes an exemplary duct cleaning tool 10 best illustrated in FIGS. 3, 4 and 5 and described in further detail below.

A conventional stacked washer/dryer set including washer "W" and clothes dryer 12 is illustrated in FIG. 1. While specific steps of the present method are implemented in the context of clothes dryer 12, it is understood that the teachings disclosed herein are equally applicable to any other stacked or stand-alone dryer appliance and that clothes dryer 12 is illustrated by way of example only. The present method may be implemented in other dryer appliances or other fixed or movable household units connected to ductwork 15 of a ventilation system 10.

Referring to FIGS. 1 and 2, the exemplary clothes dryer 12 operates in a conventional manner understood in the art, and incorporates conventional parts, features and electrical controls. As shown diagrammatically in FIG. 2, the clothes dryer 12 includes a generally cylindrical drum 21, an electric motor 22 and belt 23 configured for rotating the drum 21, an intake duct 25, a heating element 26 communicating with the intake duct 25, and a removable lint screen 28 located at the dryer exhaust 13. The intake duct 25 defines an ambient air entrance at one end 25A and is connected to a rear wall of the dryer 12 adjacent the drum 21 at an exit end 25B. At exit end 25B, conditioned (e.g., heated) air leaves the intake duct 25 and enters the clothes chamber of drum 21. The heating element 26 resides between opposite ends of the intake duct 25, and may incorporate a gas burner, electrical-resistance or other heating means. The exhaust duct 14 is connected to the dryer exhaust 13 and communicates with an air handler 31 (e.g., electric blower or fan) of the dryer ventilation system 10. The additional ductwork 15 extends from the air handler 31 through building walls 32 to the outdoor hooded vent 16. In standard dryer ventilation systems, the ductwork has a minimum 4" inch diameter and is fabricated of rigid metal (e.g., galvanized or aluminum) in all concealed locations.

During operation of the clothes dryer 12, the air handler 31 draws ambient air into the entrance 25A of intake duct 25 thereby generating a pressurized laminar airflow through the heating element 26 and outlet end 25B, and into the clothes chamber of the rotating drum 21. The heating element 26 heats the laminar airflow prior to entering the drum chamber. Within the heated chamber, accumulated moisture from damp tumbling clothes "C" is drawn outwardly by the air handler 31 through the removable lint screen 28 and dryer exhaust 13. The lint screen 28 traps certain lint particles entrained in the heated airflow, while other lint and debris escape into the exhaust duct 14 and other ductwork 15 of the ventilation system 10. After each use of the dryer 12, the lint screen 28 must be removed from a screen housing 32 at the front bulkhead 34 of dryer 12 and then cleaned in order to help reduce the buildup of lint and debris within the ventilation system 10. Once cleaned, the lint screen 28 is inserted back into the screen housing 32 through screen housing opening 35. Lint and debris collecting inside the ventilation system 10 creates a fire hazard and may increase the time and energy required to dry laundry.

In an exemplary embodiment, the present method utilizes a duct cleaning tool 50, described further below, configured for use in combination with a portable handheld high-speed blower 51 (FIG. 4) to clean the ventilation system 10 of the clothes dryer 12. The portable blower 51 may comprise any commercially available high-speed electric or gas-powered blower having an elongated hollow appliance tube 52 and motor 54 capable of generating a positive laminar flow rate of up to 500 CFM or more through the tube 52. One commercially-available example of a suitable blower applicable in the present method is the Kobalt 140 MPH 80-Volt Max Lithium Ion (Li-Ion) Brushless Cordless Electric Leaf Blower manufactured and sold by LF, LLC, a Delaware limited liability company, having a place of business located at 1000 Lowe's Boulevard, Mooresville, North Carolina. This Kobalt blower produces up to 630 CFM.

Exemplary Duct Cleaning Tool 50

Figure 4:
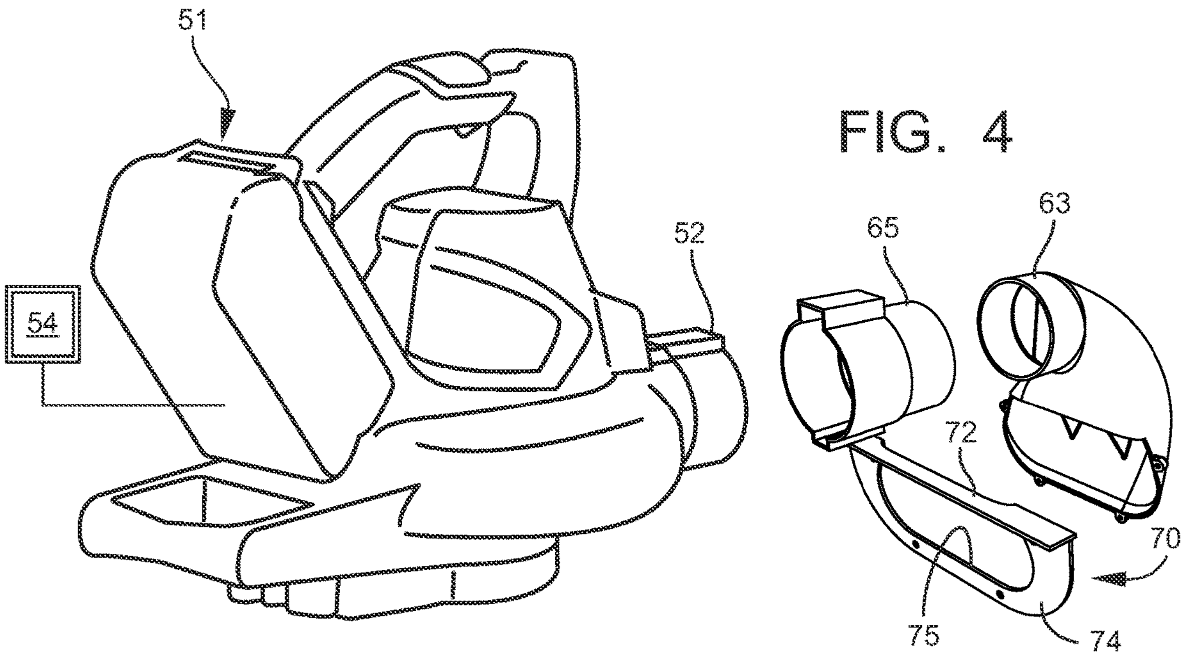
FIG. 4 is an exploded view of the exemplary duct cleaning tool and handheld blower.
Figure 5:
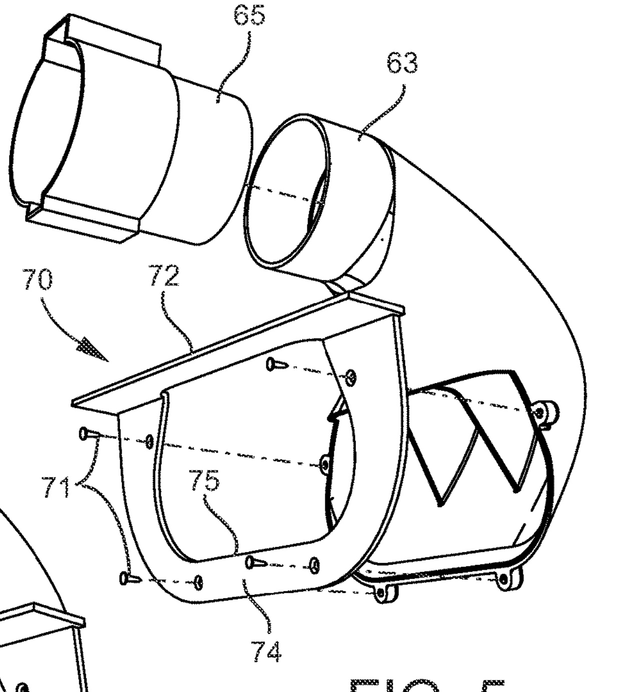
FIG. 5 is a further exploded view of the exemplary duct cleaning tool.
Figure 3:
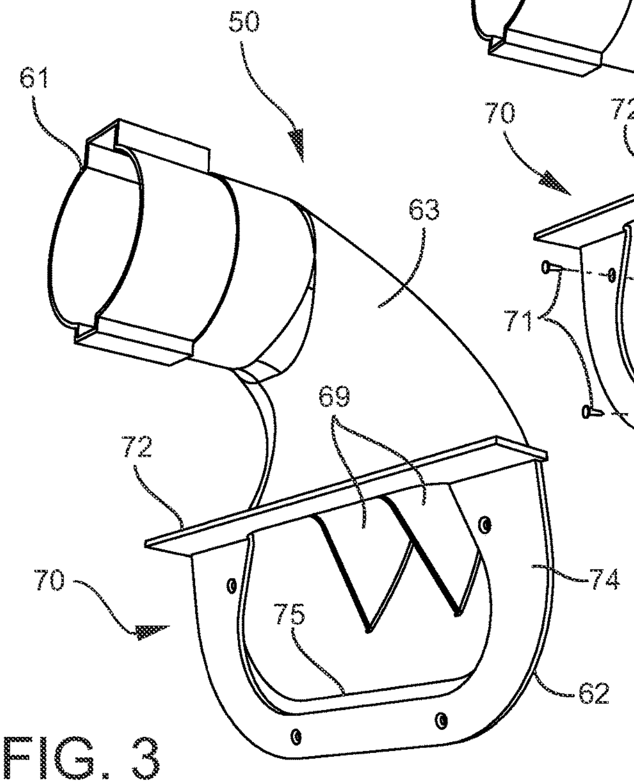
FIG. 3 is a perspective view of an exemplary duct cleaning tool according to one embodiment of the present disclosure.
Figure 6:
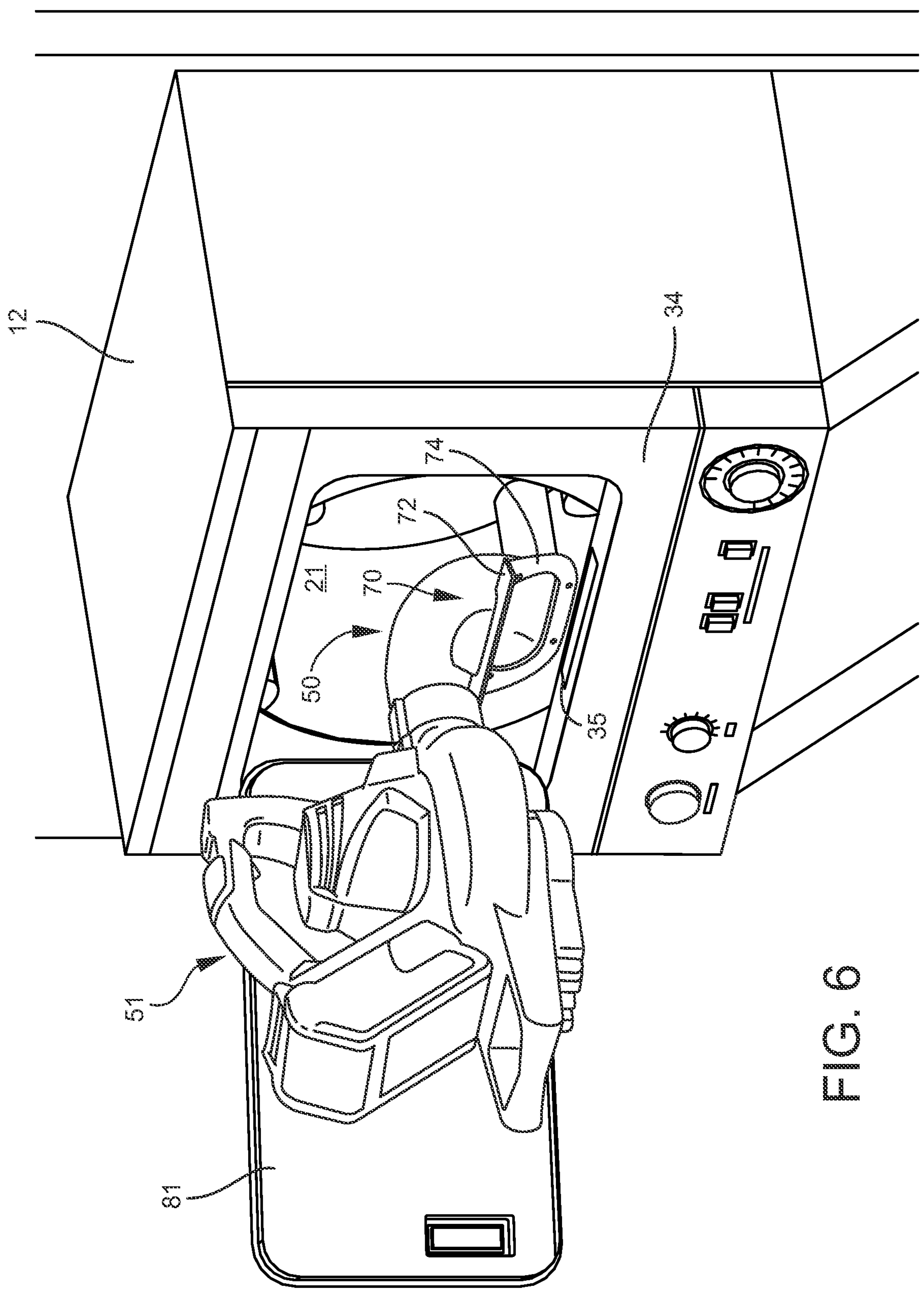
FIGS. 6 and 7 are views demonstrating application of the exemplary duct cleaning appliance (combined blower and tool) in the clothes dryer in an exemplary implementation of the present method.

Referring to FIGS. 3, 4 and 5, the exemplary duct cleaning tool 50 has a substantially hollow molded construction with open proximal and distal ends 61, 62 and an elongated hollow air transfer tube 63 extending between the ends 61, 62. The open proximal end 61 incorporates an adapter 65 (or fitting) designed to frictionally attach the tool 50 directly to an end of the appliance tube 52 of handheld blower 51, while the open distal end 62 is arcuately formed and comprises an exchangeable dryer interface 70. The dryer interface 70 is attached to the tool 50 by fasteners 71 and is configured to closely engage the front bulkhead 34 of the dryer 12 at an opening into the clothes chamber of drum 21. With the lint screen 28 removed from the dryer 12, as demonstrated in FIG. 1, the dryer interface 70 of tool 50 operatively covers and air-seals the screen housing opening 35 at lint exhaust 13. In the exemplary embodiment, the distal end 62 of the duct cleaning tool 50 is arcuately downwardly turned relative to a longitudinal axis of the air transfer tube 63. Internal reinforcement ribs 69 may be integrally molded with the tool 50 proximate the curved distal end 62.

Figure 7:
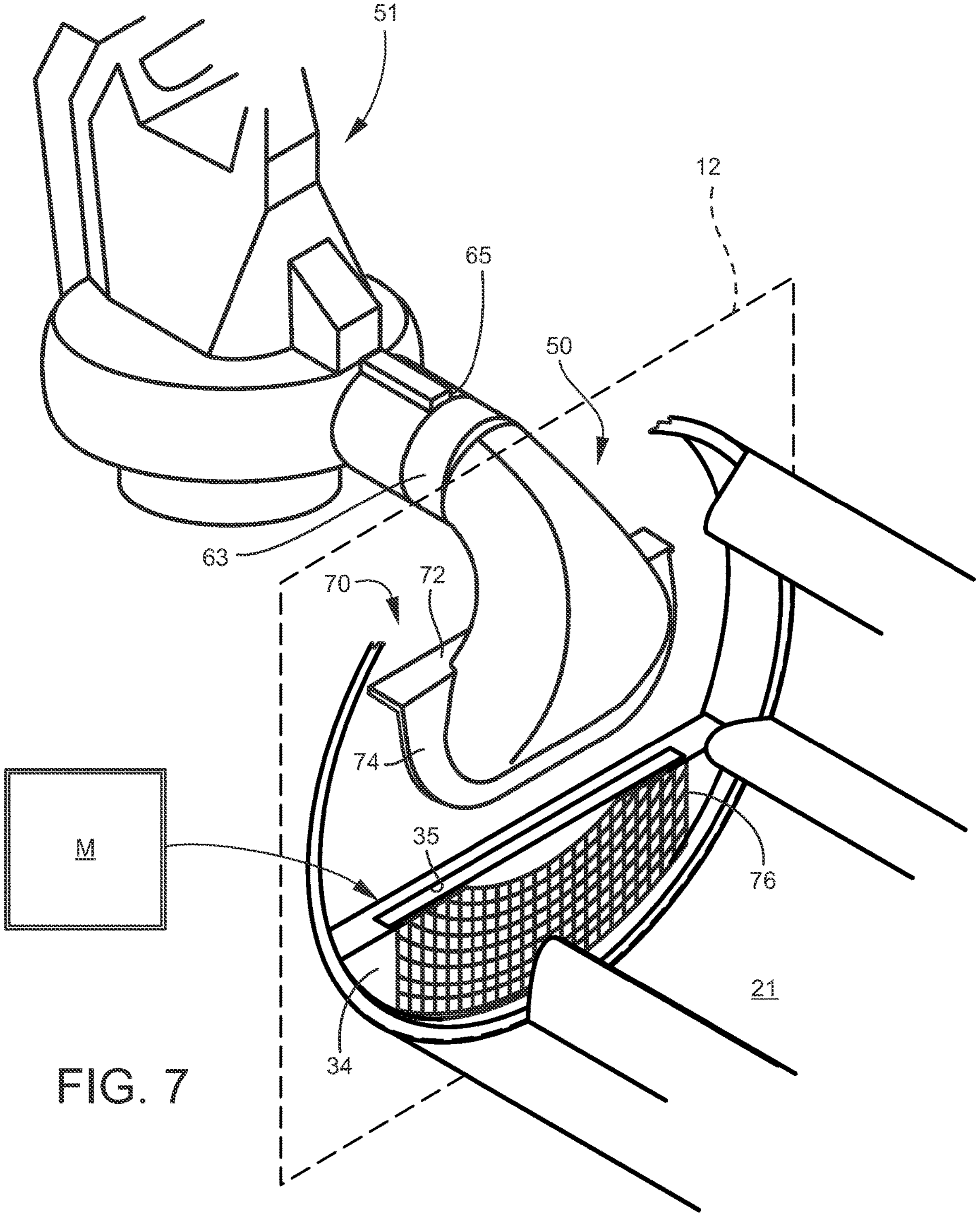
Figure 11:
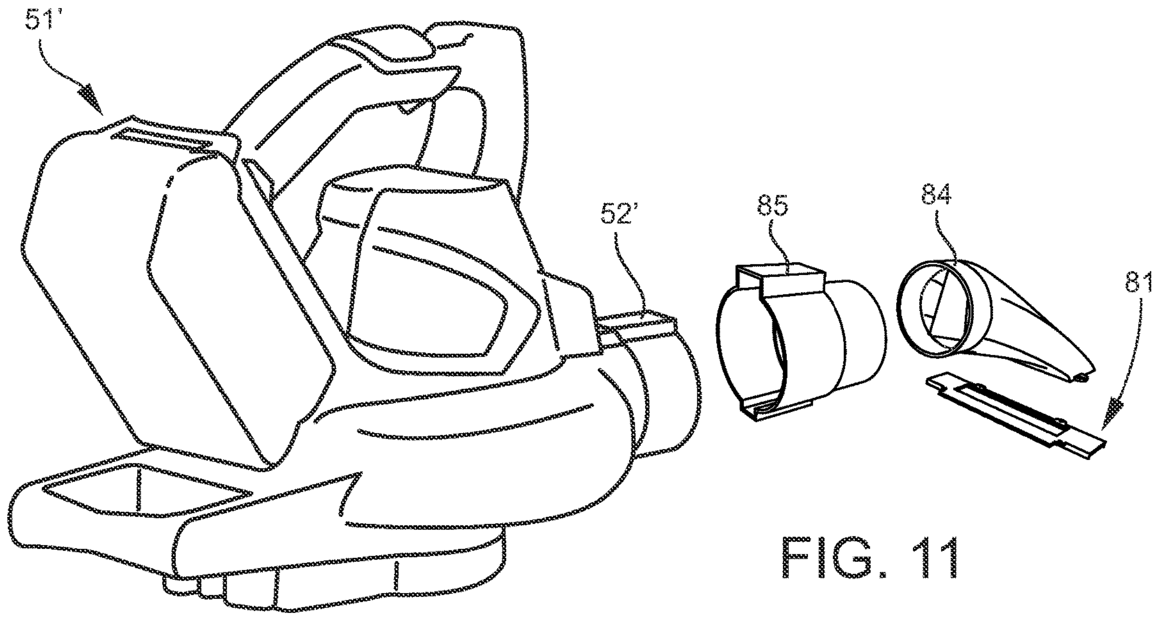
FIG. 11 is an exploded view of the alternative duct cleaning tool and handheld blower.
Figure 12:
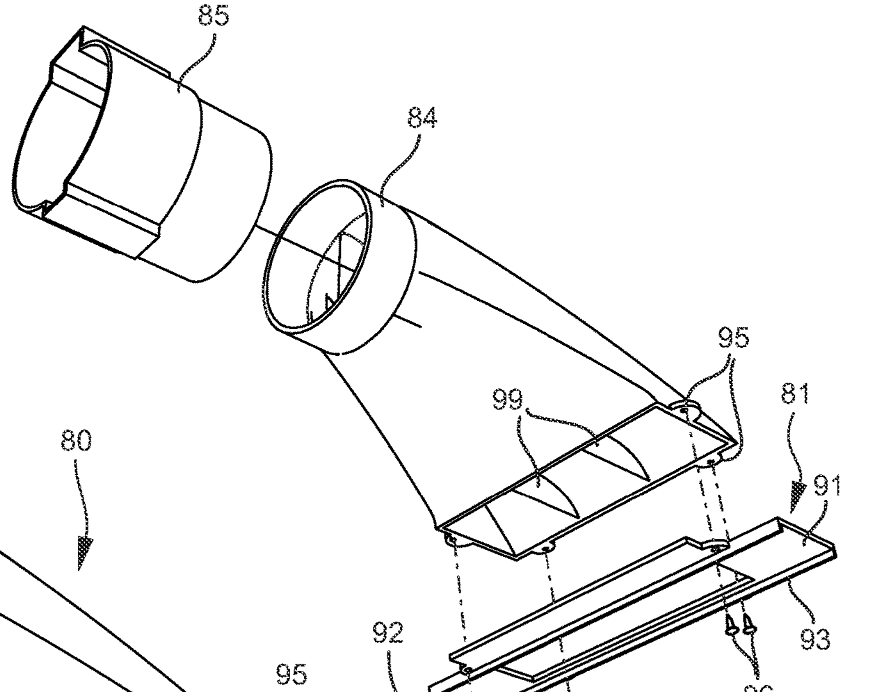
FIG. 12 is a further exploded view of the alternative duct cleaning tool.
Figure 10:
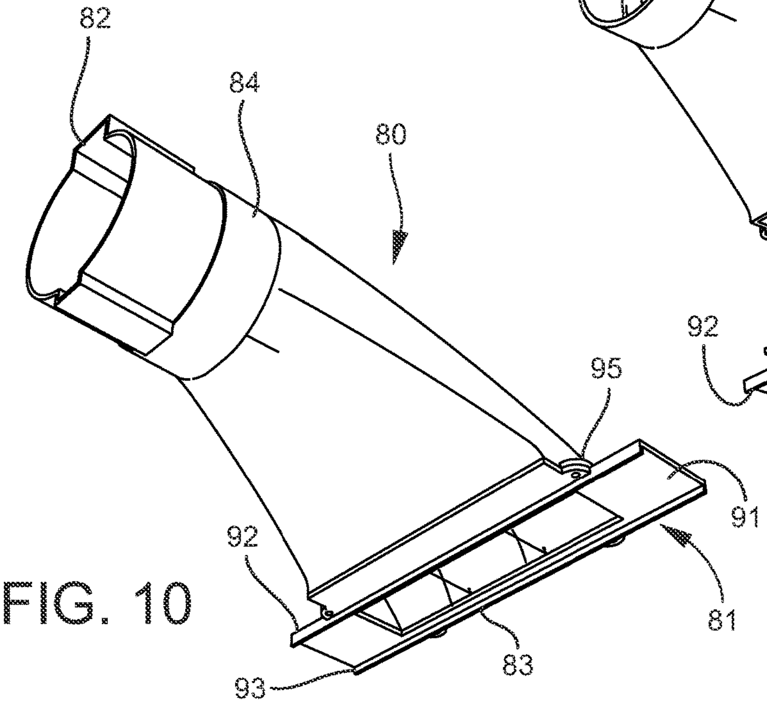
FIG. 10 is a perspective view of an alternative exemplary duct cleaning tool according to the present disclosure.

In the exemplary duct cleaning tool 50, the dryer interface 70 is exchangeable with alternative attachments, such as shown in FIGS. 10-12, in order to accommodate the particular brand and style of clothes dryer 12. Dryer interface 70 has a generally horizontal top wall 72 and a flat angled surround 74. The top wall 72 comprises a thin solid structure configured to entirely cover the screen housing opening 35 at the front bulkhead 34 of the dryer 12. The angled surround 74 of dryer interface 70 is integrally molded with the top wall 72 and defines an opening 75 shaped to substantially match a grill opening 76 (FIG. 7) formed at the lint exhaust 13 on a backside of the front bulkhead 35. The obtuse angle of the surround 74 relative to the top wall 72 is approximately 100 degrees. The surround 74 provides fasteners points 78 through which the fasteners 71 are inserted to removably attach the dryer interface 70 at the arcuate distal end 62 of the duct cleaning tool 50. The duct cleaning tool 50 is then frictionally attached to the appliance tube 52 of the blower 51 using adapter 65 as previously described.

Figure 8:
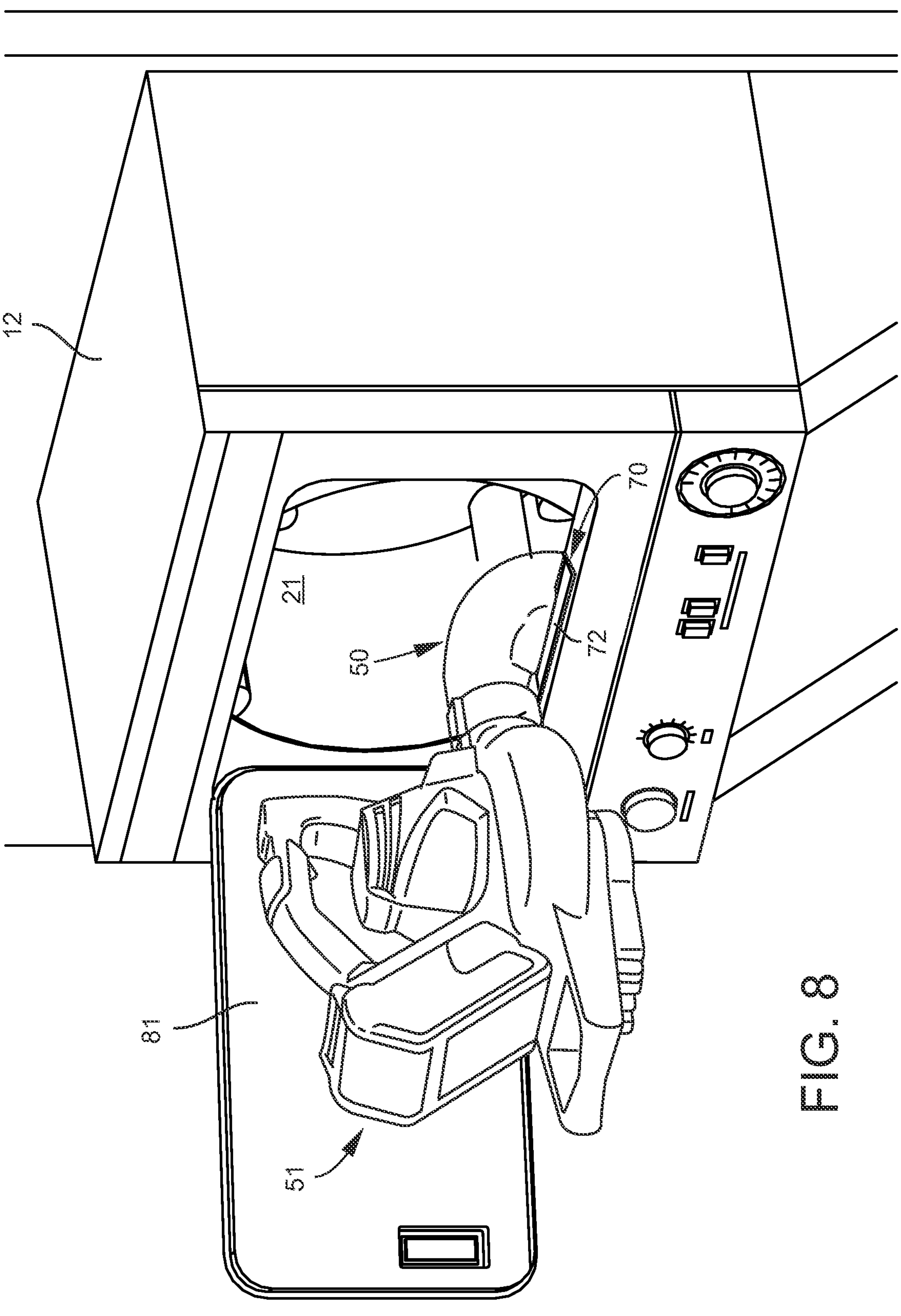
FIGS. 8 and 9 are views showing the exemplary duct cleaning appliance operatively positioned on the clothes dryer during implementation of the present method.
Figure 9:
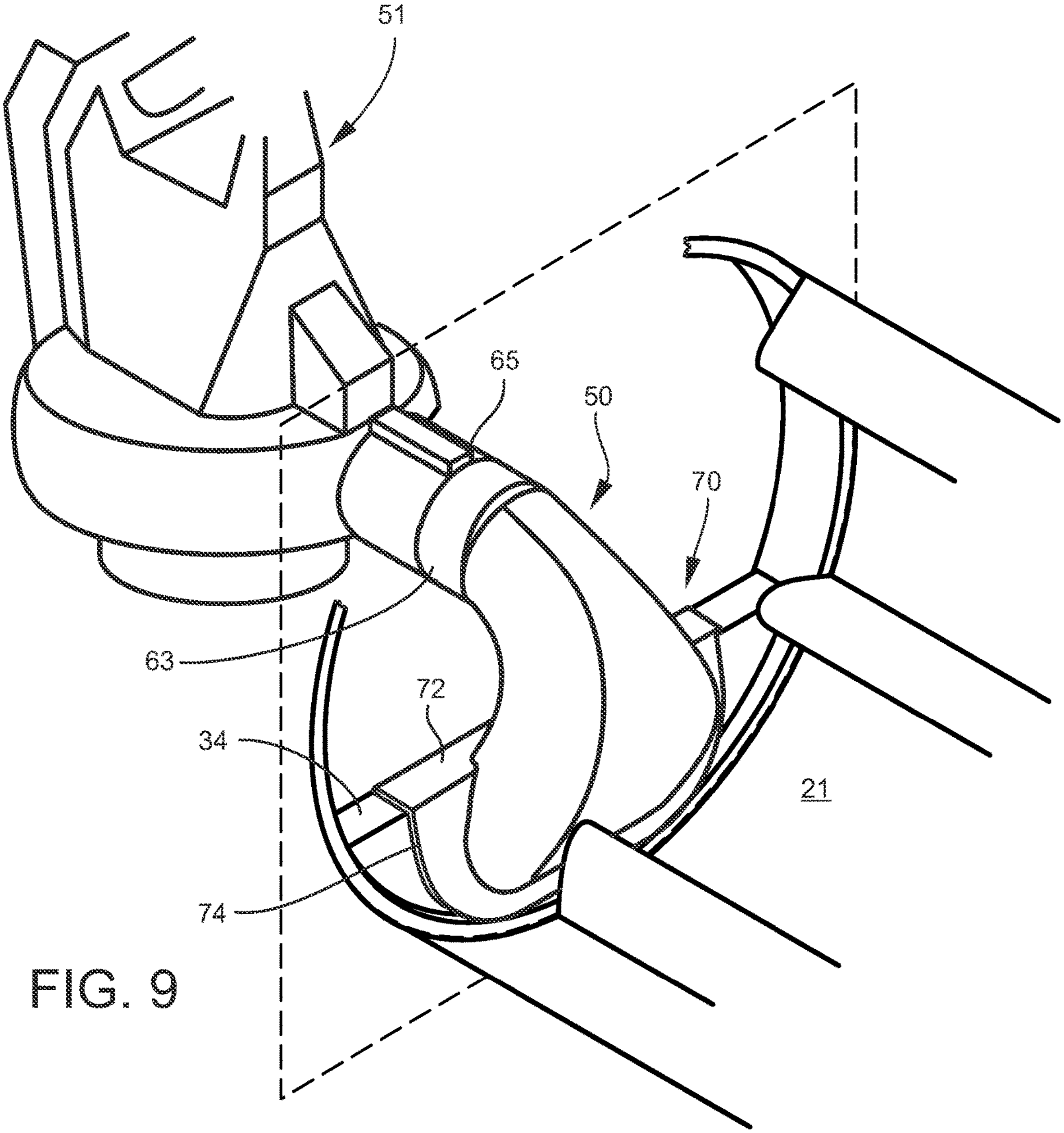

Referring to FIGS. 1, 2 and 6-9, to clean the dryer ventilation system 10 the user opens the pivoted dryer door 81 (FIG. 1) and first removes the lint screen 28 from screen housing 32 through screen housing opening. With lint screen 28 removed, the user may deposit a small quantity loose granular organic material "M" into the screen housing opening 35. As demonstrated in FIGS. 6-9, the dryer interface 70 of the duct cleaning tool 50 is then placed over the screen housing opening 35 such that the top wall 72 of the interface 70 entirely covers and substantially air-seals the opening 35 at the front bulkhead 34 of the dryer 12, while the angled surround 74 fits closely against the backside of the bulkhead 34 immediately adjacent the grill opening 76 of lint exhaust 13. When the duct cleaning tool 50 is properly positioned, as shown in FIGS. 8 and 9, the dryer interface 70 cooperates with the air transfer tube 63 to form an interrupted pathway for pressurized laminar airflow from the blower 51. Upon activating the blower 51, pressurized air (at a flow rate of up to 500 CFM or more) is generated and directed through the appliance tube 52 and duct cleaning tool 50, and into the dryer ventilation system 10 through the lint exhaust 13—best shown in FIG. 2. Any lint or debris collected inside the ventilation system 10 is evacuated along with the loose organic material "M" through the exhaust duct 14 and other ductwork 15, and outwardly from the building through the outdoor hooded vent 16.

A further embodiment of an exemplary duct cleaning tool 80 and dryer interface 81 applicable in the present method is illustrated in FIGS. 10, 11 and 12. The duct cleaning tool 80 is likewise configured for use in combination with a conventional portable handheld high-speed blower, such as blower 51', to clean the ventilation system of a clothes dryer. Like exemplary tool 50 previously described, the duct cleaning tool 80 has a substantially hollow molded construction with open proximal and distal ends 82, 83 and an elongated hollow air transfer tube 84 extending between the ends 82, 83. The open proximal end 82 incorporates an adapter 85 designed to frictionally attach the tool 80 directly to an end of the appliance tube 52' of handheld blower 51', while the open distal end 83 is arcuately formed. The dryer interface 81 is configured to closely engage the front bulkhead of the dryer at the opening into the clothes chamber of drum, as previously described. The dryer interface 81 has a generally thin and flat horizontal surround 91 with opposing downwardly turned longitudinal edges 92, 93, and defines a generally rectangular opening 94 shaped to substantially match the screen housing opening (not shown) formed at the front bulkhead of the clothes dryer. Molded fastener tabs 95 are integrally formed with the dryer interface 81 and receive respective fasteners 96 to removably attach the interface 81 at the distal end 83 of the tool 80. Internal reinforcement ribs 99 may be molded with the tool 80 proximate the curved distal end 83.

In this exemplary embodiment, the dryer interface 81 of the duct cleaning tool 80 is placed over the screen housing opening (not shown) such that the surround 91 closely engages the front bulkhead immediately adjacent the screen housing opening and forms a substantially air-sealed pathway for passage of pressurized laminar airflow from the blower 51', through the tool 80 and into the ventilation system of the clothes dryer. This particular clothes dryer may not have a grill opening formed on the backside of the front bulkhead, but instead may have other perforated vent holes form in the bulkhead or rear wall of the metal drum. Prior to activating the blower 51' and implementing steps of the present method, these perforated vent holes may be removably covered using a flat flexible magnet, adhesive tape, or other such means. Upon activating the blower 51', the duct cleaning tool 80 and attached dryer interface 81 operate in a similar manner described above to evacuate any lint or debris collected inside the ventilation system of the clothes dryer.

In further alternative exemplary embodiments, the dryer interface may be any other suitable size and shape sufficient to effectively cover that portion of the clothes dryer immediately surrounding the lint exhaust. Many commercially available dryers have easily accessible lint screens located the lint exhaust while others may be relatively hidden from view. Common locations for lint screens include just inside the dryer door, on the dryer back wall, on the top right corner of the dryer, and others.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112 (f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A duct cleaning appliance adapted for cleaning a ventilation system of a clothes dryer, the ventilation system comprising ductwork communicating with a lint exhaust of the clothes dryer and extending to a remote discharge location, said duct cleaning appliance comprising:

a portable handheld blower comprising an elongated hollow appliance tube, and a motor configured to generate a positive airflow outwardly through said hollow appliance tube;

a hollow duct cleaning tool comprising an open proximal end and an open distal end, the open proximal end configured to removably connect said duct cleaning tool to said hollow appliance tube of said blower, and the open distal end configured to cover and operatively air-seal an entrance of a screen housing opening at the lint exhaust of the clothes dryer without inserting into the screen housing opening;

whereby upon locating and operatively air-sealing the open distal end of said duct cleaning tool over the screen housing entrance opening of the clothes dryer and activating said blower, pressurized airflow is generated and directed through said duct cleaning tool and lint exhaust of the clothes dryer, thereby evacuating lint and debris collected inside the ductwork of the ventilation system.

2. The duct cleaning appliance according to claim 1, and comprising an adapter located at the proximal end of said duct cleaning tool and configured to removably attach said duct cleaning tool to said appliance tube of said blower.

3. The duct cleaning appliance according to claim 1, wherein said duct cleaning tool comprises an elongated hollow air transfer tube extending between said blower and the open distal end of said duct cleaning tool.

4. The duct cleaning appliance according to claim 3, wherein the distal end of said duct cleaning tool is arcuately turned relative to a longitudinal axis of said air transfer tube.

5. The duct cleaning appliance according to claim 1, and comprising an exchangeable dryer interface located at the distal end of said duct cleaning tool.

6. The duct cleaning appliance according to claim 1, wherein said blower is configured to generate a flow rate greater than 500 CFM.

7. A duct cleaning tool configured for use in combination with a portable airstream appliance to clean a ventilation system of a clothes dryer, the ventilation system comprising ductwork communicating with a lint exhaust of the clothes dryer and extending to a remote discharge location, said duct cleaning tool comprising open proximal and distal ends and an elongated hollow air transfer tube extending between the open proximal and distal ends, and the open proximal end configured to removably connect said duct cleaning tool to the portable airstream appliance, and the open distal end of said duct cleaning tool configured to cover and operatively air-seal an entrance of a screen housing opening at the lint exhaust of the clothes dryer without inserting into the screen housing opening;

whereby upon connecting said duct cleaning tool to the portable airstream appliance, locating and operatively air-sealing the open distal end of said duct cleaning tool over the screen housing entrance opening of the clothes dryer, and activating the portable airstream appliance, pressurized airflow is generated and directed through said duct cleaning tool, lint exhaust and ventilation system of the clothes dryer, thereby evacuating lint and debris collected inside the ductwork of the ventilation system.

8. The duct cleaning tool according to claim 7, and comprising an exchangeable dryer interface located at the distal end of said duct cleaning tool.

9. The duct cleaning tool according to claim 7, wherein the distal end of said duct cleaning tool is arcuately turned relative to a longitudinal axis of said air transfer tube.

10. The duct cleaning tool according to claim 7, and comprising an adapter located at the proximal end of said duct cleaning tool and configured to removably attach said duct cleaning tool to the portable airstream appliance.

* * * * *